(12) United States Patent
Gerlach et al.

(10) Patent No.: US 12,730,204 B2
(45) Date of Patent: Sep. 8, 2026

(54) METHOD FOR ULTRASOUND-BASED OBJECT CLASSIFICATION AND DEVICE FOR PERFORMING ULTRASOUND-BASED OBJECT CLASSIFICATION

(71) Applicant: Robert Bosch GmbH, Stuttgart (DE)

(72) Inventors: Andre Gerlach, Leonberg-Hoefingen (DE); Jona Eisele, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 104 days.

(21) Appl. No.: 18/967,711

(22) Filed: Dec. 4, 2024

(65) Prior Publication Data

US 2025/0189647 A1 Jun. 12, 2025

(30) Foreign Application Priority Data

Dec. 8, 2023 (DE) ..................... 10 2023 212 401.7

(51) Int. Cl.
*G01S 7/539* (2006.01)
*G01S 7/00* (2006.01)
*G01S 15/52* (2006.01)

(52) U.S. Cl.
CPC .............. *G01S 7/539* (2013.01); *G01S 7/003* (2013.01); *G01S 15/52* (2013.01)

(58) Field of Classification Search
CPC .......... G01S 7/539; G01S 7/003; G01S 15/52; G01S 15/931; G01S 2015/932; G06F 18/241; G06N 3/0464
See application file for complete search history.

(56) References Cited

U.S. PATENT DOCUMENTS

| | | | | |
|---|---|---|---|---|
| 2020/0368616 | A1* | 11/2020 | Delamont | A63F 13/52 |
| 2024/0295643 | A1* | 9/2024 | Gerlach | G01S 15/02 |
| 2025/0189647 | A1* | 6/2025 | Gerlach | G01S 7/003 |
| 2025/0347791 | A1* | 11/2025 | Gerlach | G01S 7/539 |

FOREIGN PATENT DOCUMENTS

| | | | | | |
|---|---|---|---|---|---|
| CA | 2383760 | A1 | * | 3/2001 | G01S 15/46 |
| CN | 113325400 | A | * | 8/2021 | B60W 30/06 |
| CN | 116014876 | A | * | 4/2023 | |
| CN | 113820719 | B | * | 4/2024 | G01S 15/931 |
| CN | 120123831 | A | * | 6/2025 | G06N 3/0464 |
| CN | 120773724 | A | * | 10/2025 | G01S 15/08 |
| CN | 121919823 | A | * | 4/2026 | |

(Continued)

*Primary Examiner* — Daniel Pihulic
(74) *Attorney, Agent, or Firm* — Norton Rose Fulbright US LLP

(57) ABSTRACT

A method for ultrasound-based object classification. The method includes generating a time reflection signal at a first ultrasonic sensor; receiving and/or generating secondary signals of at least one or more ultrasonic sensors adjacent to the first ultrasonic sensor, and extracting predetermined features from the secondary signals, which are generated at the adjacent ultrasonic sensors when the time reflection signal is received; transmitting the time reflection signal and the predetermined features from the secondary signals to a classifier device; fusing the time reflection signal and the predetermined features by the classifier device, wherein a training data set for a present sensor arrangement is taken into account; and outputting an object classification by the classifier device.

12 Claims, 4 Drawing Sheets

(56) References Cited

FOREIGN PATENT DOCUMENTS

| | | | | |
|---|---|---|---|---|
| DE | 102015120659 | A1 | 6/2017 | |
| DE | 102018222705 | A1 * | 6/2020 | ........... G01S 15/878 |
| DE | 102023202159 | A1 * | 9/2024 | ........... G01S 15/931 |
| DE | 102023209510 | A1 * | 4/2025 | ............. G01S 7/527 |
| DE | 102023212401 | A1 * | 6/2025 | ........... G06N 3/0464 |
| DE | 102024204244 | A1 * | 11/2025 | ........... G01S 15/931 |
| DE | 102024208451 | A1 * | 3/2026 | ............... G01S 7/53 |
| WO | WO-2025067731 | A1 * | 4/2025 | ............. G01S 7/527 |

* cited by examiner

METHOD FOR ULTRASOUND-BASED OBJECT CLASSIFICATION AND DEVICE FOR PERFORMING ULTRASOUND-BASED OBJECT CLASSIFICATION

CROSS REFERENCE

The present application claims the benefit under 35 U.S.C. § 119 of German Patent Application No. DE 10 2023 212 401.7 filed on Dec. 8, 2023, which is expressly incorporated herein by reference in its entirety.

FIELD

The present invention relates to a method for ultrasound-based object classification and to a device for performing ultrasound-based object classification.

BACKGROUND INFORMATION

Typical ultrasonic sensors can be based on the pulse-echo principle, wherein an electrical signal can stimulate the transducer at its membrane to vibrate, wherein the vibrations can be emitted as sound. The surface of an object reflects the sound, which can result in backscattering in the direction of the ultrasonic sensor. When the backscattered sound impinges on the membrane, the membrane can be put into vibrations and an electrical signal can be generated at the piezo element. Such ultrasonic sensors measure the travel time of the sound from its emission to its return, and the distance to the backscattering object can be ascertained therefrom by means of the known speed of sound propagation. After some signal pre-processing steps, such as filtering, individual amplitude values and associated correlation values, which can represent the large values in the sound pressure time signal, can be formed by means of methods for forming threshold values with simple or more complex and adaptive methods. An echo of an object can be detected by comparing the received amplitude of the sound to a threshold value, and only the echoes of objects whose amplitude is above the threshold value are typically considered relevant and evaluated further. Conventional ultrasonic sensors may only transmit a few such amplitude values or correlation values, which are often referred to as echo values. In this way, up to echo values may, for example, typically be ascertained for one measurement cycle and transmitted from the sensor output to a control unit.

Ultrasonic systems can already be used in the automotive sector to estimate distances, in particular in the field of parking assistance systems, wherein distances can be estimated relatively robustly by means of such ultrasonic systems, but distinguishing objects by means of sensors or determining object dimensions according to currently common methods/systems are prone to a higher degree of inaccuracy. Increasing the performance capability of ultrasonic sensors may be particularly relevant for complex driving functions, such as more highly or fully automated driving.

Germany Patent Application No. DE 10 2015 120 659 A1 describes an ultrasonic sensor.

SUMMARY

The present invention provides a method for ultrasound-based object classification, and a device for performing ultrasound-based object classification.

Preferred example embodiments and developments of the present invention are disclosed herein.

An object of the present invention is to provide a method for ultrasound-based object classification and a device for performing ultrasound-based object classification with a plurality of ultrasonic sensors, wherein object classification and domain adaptation in the case of different sensor constellations can be improved.

According to an example embodiment of the present invention, the method for ultrasound-based object classification involves generating a time reflection signal at a first ultrasonic sensor; receiving and/or generating secondary signals of at least one or more ultrasonic sensors adjacent to the first ultrasonic sensor, and extracting predetermined features from the secondary signals, which are generated at the adjacent ultrasonic sensors when the time reflection signal is received; transmitting the time reflection signal (and ascertaining the features from it) and the predetermined features (and ascertaining them from the signal) from the secondary signals to a classifier device; fusing the time reflection signal and the predetermined features by the classifier device, wherein a training data set for a present sensor arrangement (such as an original position, and/or changed according to a specification) can be taken into account; and outputting an object classification by the classifier device.

The object classification can be carried out on a device with ultrasonic sensors, such as those used in automotive and industrial applications for distance determination or environmental sensing, wherein such ultrasonic sensors can consist of a plurality of components, for example a transducer, a sensor housing, a seal, electronics, and a connector.

According to an example embodiment of the present invention, in addition to a feature fusion of adjacent sensors and corresponding network architecture, a method for domain adaptation can be provided, which can allow efficient classification in the system network in the case of different sensor arrangements without the effort or with reduced effort of additional measurement campaigns. This can result in increased robustness of the classification models with reduced network complexity and hardware requirements along with low application effort.

The predetermined features can, for example, relate to the signal curve (certain variations, extremes, etc.). The time reflection signal can be a transmitted and already reflected signal. The secondary signals can be received signals of the adjacent sensors.

According to a preferred embodiment of the method of the present invention, the classifier device comprises a neural network or, in particular, a convolutional neural network (CNN) with feature maps of the first ultrasonic sensor and/or of the adjacent ultrasonic sensors.

According to a preferred embodiment of the method of the present invention, compressed feature maps from CNN convolutional layers of the adjacent ultrasonic sensors are transmitted and taken into account in addition to time signals from the first ultrasonic sensor.

According to a preferred embodiment of the method of the present invention, in an initial step, features are extracted at the first ultrasonic sensor and at the adjacent ultrasonic sensors and, in the process, convolutional layers are applied and, for fusing the features, feature maps are added to the features of the first ultrasonic sensor and concatenated, and then a further convolutional layer is used for the concatenated feature maps when extracting the fused features, and then the feature data are smoothed and a fully-connected layer carries out object classification.

According to a preferred embodiment of the method of the present invention, the training data set comprises measurements of known objects at known positions of the objects and a fixed sensor arrangement (original and/or subsequently changed according to a specification).

According to a preferred embodiment of the method of the present invention, the training data set is processed individually for a predetermined vehicle type.

According to a preferred embodiment of the method of the present invention, the training data set takes into account an angle of attack of the first ultrasonic sensor and/or of the adjacent ultrasonic sensors. The angle of attack can refer to the vertical inclination of a sensor, which can vary depending on the vehicle type and sensor position.

According to a preferred embodiment of the method of the present invention, the training data set takes into account a sensor position with respect to a travel time modification and/or amplitude modification with respect to a movement of the horizontal and/or vertical sensor position and/or object position.

According to a preferred embodiment of the method of the present invention, the training data set takes into account a geometry of the installation environment of the first ultrasonic sensor and/or the adjacent ultrasonic sensors.

According to a preferred embodiment of the method of the present invention, fine-tuning of the classifier device and of a model which the classifier device applies takes place, wherein predetermined weights in the neural network are adapted and an adaptation to a target domain of the sensor arrangements takes place in the process.

According to the present invention, a device for performing an ultrasound-based object classification comprises a control device and/or computer device, which can be connected to the first ultrasonic sensor and to adjacent ultrasonic sensors, and the control device and/or computer device is configured to perform a method according to the present invention.

The method and/or the device of the present invention can be used to increase the performance capability of the ultrasonic sensors in the system network, wherein the use of machine learning methods or artificial neural networks is in particular suitable for the classification of obstacles. Obstacles can be classified using time signals, envelopes or simply echo points as input into a neural network. A corresponding time signal can provide a large information content as input, and the classification output may, for example, be in aggregated object classes or with respect to the object height.

For improving the classification performance of a single sensor, a plurality of sensors in the system network can be used for classification, and it can be advantageous to aim to include features of the detected signals of adjacent sensors in the classification decision of each individual sensor. Furthermore, spatial scanning of obstacles at different angles can provide further information about the object geometry and thus have a positive effect on the classification.

However, a sensor position or the sensor arrangement can vary depending on the vehicle type. In particular, changes in the amplitudes and sound travel times result from the changed sensor arrangement. If a neural network has learned in a training process how to work with features of a specific sensor arrangement, the performance capability in working with other sensor arrangements unknown to the network can usually be significantly reduced. Therefore, there may be a different distribution of the data points in the target domain than in the domain of the training data, which in the field of machine learning may generally be referred to as a domain shift or distributional shift.

The conventional classification model can often handle different sensor arrangements with comparable performance capability only if training data sets with measurements under all potential sensor arrangements are available and a separate model for each vehicle type is trained with a corresponding partial data set. On the other hand, according to conventional approaches, a model can be trained with training data of all possible sensor arrangements, which model can be applied equally to all vehicle types and can implicitly recognize and take into account the sensor arrangements. However, the latter approach can require a significantly higher level of model complexity, as a result of which increased hardware requirements can arise. With the so-called application, an ultrasonic system can be adapted to a new vehicle type, which can however require increased simulations and vehicle measurements.

Methods that solve the domain shift problem are defined as domain adaptations, wherein a model that has already been trained on a certain data domain can be adapted to a target domain.

Such methods for domain adaptation, as a result of which the additional measurement effort can be prevented or reduced, are desirable and are achieved within the framework of the method and the device.

With conventional methods of domain adaptation from the field of machine learning, fine-tuning with additional, specifically selected measurement data from the target domain can be applied in addition to the initial training of the model with labeled data.

This makes it possible to detect measurement data on a reduced scale for each vehicle type.

Classification can advantageously be implemented in a sensor network and, for this purpose, pre-processed feature maps of the adjacent sensors can be used for the classification decision of a single sensor, and this method for feature fusion by means of a CNN with a plurality of input interfaces can be implemented as a classification model. Although classification results can still be available (ascertained) for each individual sensor, they benefit from the detected information of the adjacent sensors. Individual classification results can be transmitted, for example in the form of softmax probabilities or a generalized embedding, to a control unit and processed further.

The method can be used for domain adaptation for ultrasound-based object classification for different sensor arrangements or vehicle types and can take place via modifications of the measured time signals in an existing training data set for simulating a changed sensor arrangement, as a result of which effort for detecting new training data sets can be eliminated or reduced.

For simulating a changed sensor arrangement, amplitude corrections and travel time corrections to the time signals may be necessary and the following influences by the sensor arrangement can be taken into account (in the training and/or adaptively during execution): the angle of attack (−25° to +25°) and the resulting change in amplitude due to the directional characteristic of the sensors; vertical or horizontal position of the sensors in the bumper and the resulting change in travel time and amplitude due to the changed distance to the obstacle and the ground; and/or geometry of the installation environment (smooth bumper/grille/mounting cone) and the resulting change in directional characteristic.

According to an example embodiment of the present invention, ultrasonic time signals of at least one sensor can be used and taken as an analog signal directly at the output of the electrical amplification circuit after the piezo element. Furthermore, a high-resolution digital ultrasonic time signal can then be generated by means of an analog-to-digital converter according to a predetermined sampling theorem, for example according to Shannon, wherein the sampling can typically take place at >=100 kHz, preferably 200 kHz.

The ultrasonic time signals can be pre-processed using filtering in order, for example, to improve a signal-to-noise ratio or to suppress extraneous noise. Such filtering can already take place before the analog-to-digital conversion, or preferably after the digitization of the time signals, wherein suitable highpass, lowpass or, advantageously, bandpass filters or decimation filters can be used for a corresponding filtering.

In a further processing step of the present invention, time-limited time segments that are relevant according to a specification can be cut out of the overall signal, which can be used for data reduction, for example.

Such cutting can take place automatically by using known temporal and geometric relationships or on the basis of the conventionally available threshold-value-based echo travel time data. Furthermore, it is also possible to evaluate the time signal by means of segments via a sliding window approach. Using a correlation function, e.g., cross-correlation with the known (synthetically generated or measured) transmission signal, can be particularly advantageous. Automatic cutting can particularly advantageously take place by means of distance-dependent variants of the transmission signal for the correlation. As an option, a plausibility check of the signal can take place by means of cross-correlation with the transmission signal during or immediately after the cutting, as a result of which the reliability of the classification can be increased and a high degree of robustness of the algorithm can be achieved overall.

According to the present invention, highly precise and efficient ultrasound-based object classification can advantageously be achieved in the sensor network.

The device of the present invention may also be distinguished by the features and the advantages mentioned in connection with the method of the present invention, and vice versa.

Further features and advantages of embodiments of the present invention will become apparent from the following description with reference to the figures.

BRIEF DESCRIPTION OF THE DRAWINGS

The present invention is explained in more detail below based upon the exemplary embodiments indicated in the schematic figures.

DETAILED DESCRIPTION OF EXAMPLE EMBODIMENTS

In the figures, identical reference signs denote identical or functionally identical elements.

Figure 1:
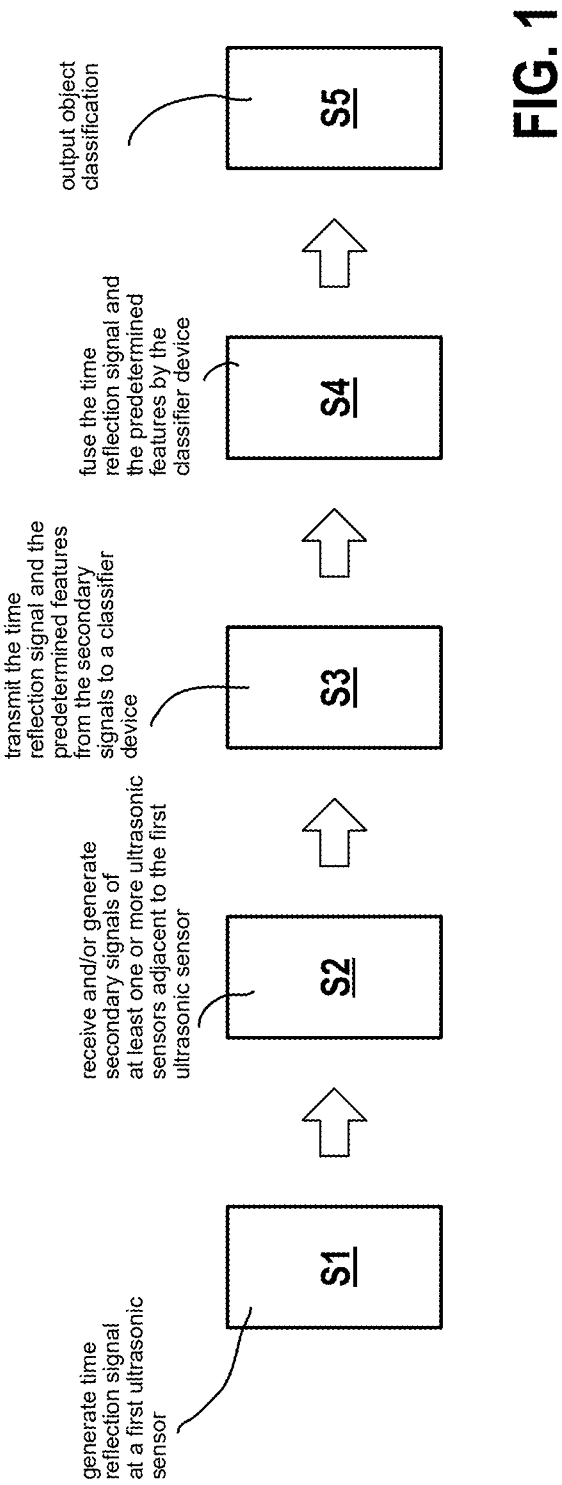
FIG. 1 shows a block diagram of method steps of the method for ultrasound-based object classification according to an exemplary embodiment of the present invention.

FIG. 1 shows a block diagram of method steps of the method for ultrasound-based object classification according to an exemplary embodiment of the present invention.

The method involves generating S1 a time reflection signal at a first ultrasonic sensor; receiving S2 and/or generating secondary signals of at least one or more ultrasonic sensors adjacent to the first ultrasonic sensor, and extracting predetermined features from the secondary signals, which are generated at the adjacent ultrasonic sensors when the time reflection signal is received; transmitting S3 the time reflection signal and the predetermined features from the secondary signals to a classifier device; fusing S4 the time reflection signal and the predetermined features by the classifier device, wherein a training data set for a present sensor arrangement is taken into account; and outputting S5 an object classification by the classifier device.

Figure 2:
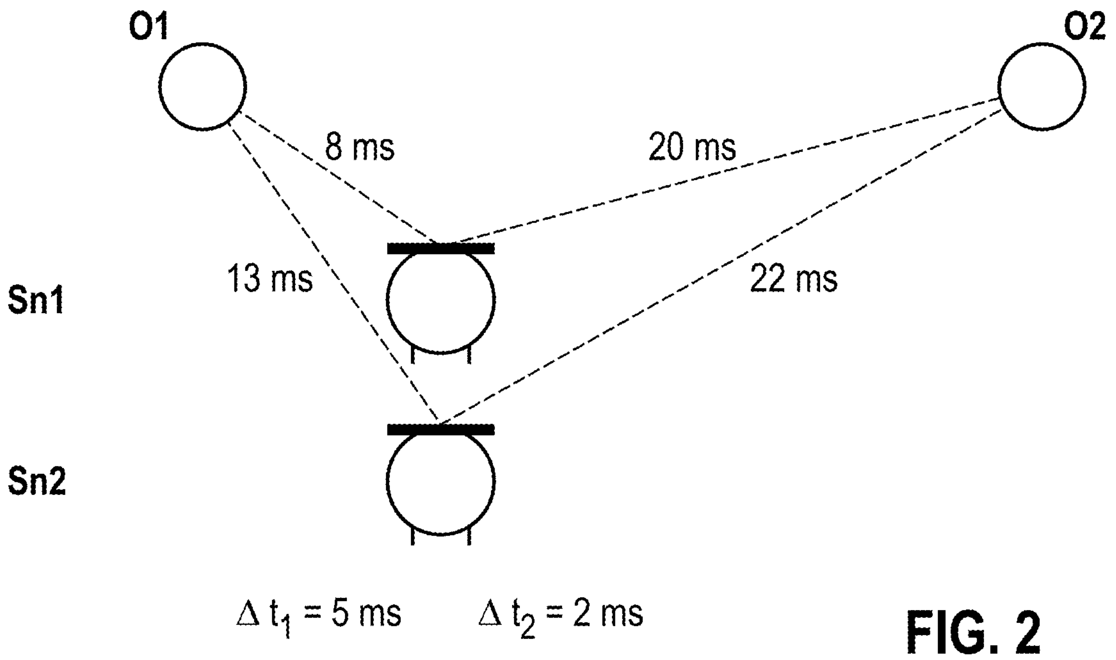
FIG. 2 shows a schematic arrangement of ultrasonic sensors and the corresponding influence of the sensor position on the sound travel time.

FIG. 2 shows a schematic arrangement of ultrasonic sensors and the corresponding influence of the sensor position on the sound travel time.

According to FIG. 2, a first sensor position Sn1 and a second sensor position Sn2 moved relative thereto are shown, which can be moved vertically relative to each other. For this purpose, the ray model shows simplified signal curves from a first object O1 to the two sensors and from a second object O2 (or change in the object position) to the two sensors (or sensor positions). When the sensor position changes, for example from Sn1 to Sn2, it may be necessary to know the exact sensor arrangement as well as the position of the object(s) (obstacles or backscattering points) in order to be able to process the signals under such influences. The positions of the sensors Sn1 and Sn2 (or of the sensor if only the position of one sensor is moved) can be known at any time, for example for different vehicle types. However, the echoes from obstacles can usually only result in the distances for each sensor and not in exact object positions or corresponding coordinates of the backscattering points in the sound field. As a result, more precise localization via multilateration by means of common sensor arrangements may often only be inadequate.

In a test bench, the exact object positions and object geometries for the test bench measurements can be given in the training data set and, since object positions and obstacle positions are given in such a case, the simulation of any sensor arrangements for the training data set can take place. Influence of a changed sensor arrangement depending on the obstacle position on the travel time can thus be estimated as shown in FIG. 2. In each case, a change in travel time also means a change in amplitude due to the geometric propagation attenuation and the airborne sound attenuation. A change in the sound travel time can depend on the sensor position and object position. In particular, for example, at the first object position O1, the change in the sensor position from Sn1 to Sn2 can result in a travel time difference of Δ t1=ms. However, with the same change in the sensor position, a travel time difference of Δ t2=2 ms can result accordingly for object position O2.

Figure 3:
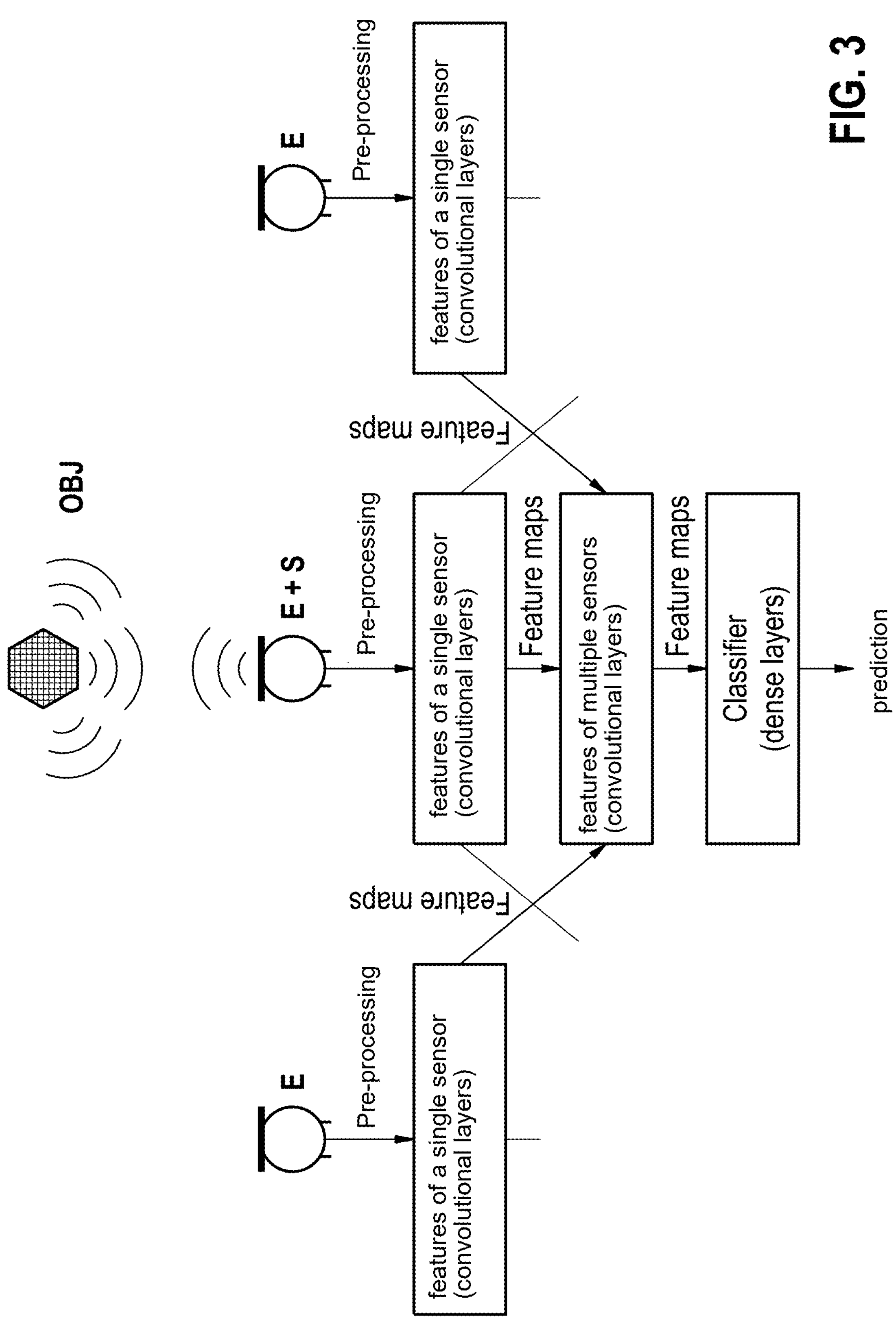
FIG. 3 shows a schematic sequence of signal detection up to classification in the sensor network according to an exemplary embodiment of the present invention.

FIG. 3 shows a schematic sequence of signal detection up to classification in the sensor network according to an exemplary embodiment of the present invention.

Three sensors are shown by way of example, wherein the middle sensor (first ultrasonic sensor) is configured to receive E and transmit S and the two adjacent sensors are each configured only to receive E, in particular the reflection on the object OBJ. After receiving, the signal from each sensor can be pre-processed and, in a subsequent step, features of each individual sensor can be extracted and applied in a respective convolutional layer. By means of extracted feature maps, a fusion of the features of a plurality of sensors can then take place and be applied in a further convolutional layer. From feature maps extracted therefrom, classification probabilities or classification embedding can be derived by applying fully-connected layers. On the basis thereof, a prediction can then be made by the classifier (classification) and output. A convolutional neural network (CNN) which can provide a classification output for detected signals of an ultrasonic sensor can be used, wherein, in addition to the time signal detected by the first ultrasonic sensor, or corresponding time-frequency transforms, features extracted from the detected time signals of adjacent sensors may also be used. On the other hand, the input of a plurality of complete time signals into the classifier would mean a high number of trainable parameters and increased requirements for hardware and data transmission, as a result of which compressed feature maps from the CNN convolutional layers of the adjacent sensors can be transmitted according to the present invention in addition to the time signal of the individual sensor.

After a first ultrasonic sensor has emitted the transmission signal, the backscattering can thus be additionally detected by the adjacent sensors. In other words, pre-processed feature maps (single sensor feature extraction) can be transmitted from the adjacent sensors to the active sensor (first ultrasonic sensor) and used for the classification decision (multi-sensor feature extraction+classifier). Alternatively, the extracted feature maps can be processed jointly on a central control unit. A more accurate CNN architecture of a sensor could be defined as follows for an input size of, for example, 64×32 (time-frequency representation):

| Layer | Input | Type | Kernel | Output | Specifications |
|---|---|---|---|---|---|
| 1 | 1 × 64 × 32 | Convolution 2D | 5 × 7 | 16 × 64 × 32 | Zero-padding, batch normalization, ReLu |
| 2 | 16 × 64 × 32 | Average pooling | 2 × 2 | 16 × 32 × 16 | |
| 3 | 16 × 32 × 16 | Convolution 2D | 1 × 5 | 32 × 32 × 16 | Zero-padding, batch normalization, ReLu |
| 4 | 32 × 32 × 16 | Convolution 2D | 5 × 1 | 32 × 32 × 16 | Zero-padding, batch normalization, ReLu |
| 5 | 32 × 32 × 16 | Average pooling | 2 × 2 | 32 × 16 × 8 | |
| 6 | 32 × 16 × 8 | Convolution 2D | 3 × 3 | 64 × 16 × 8 | Zero-padding, batch normalization, ReLu |
| 7 | 64 × 16 × 8 | Average pooling | 2 × 2 | 64 × 8 × 4 | |
| 8 | 3 × 64 × 8 × 4 | Concatenate | | 192 × 8 × 4 | Interface of adjacent sensors |
| 9 | 192 × 8 × 4 | Convolution 2D | 3 × 3 | 192 × 8 × 4 | Zero-padding, batch normalization, ReLu |
| 10 | 192 × 8 × 4 | Average pooling | 2 × 2 | 192 × 4 × 2 | |
| 11 | 192 × 4 × 2 | Flatten | | 1536 | |
| 12 | 1536 | Fully connected | | 256 | Batch normalization, ReLu |
| 13 | 256 | Fully connected | | 7 | Softmax |

The table above shows an exemplary CNN architecture with aggregation into seven object classes.

The input images (transformed signals) can be generated in a pre-processing via a time-frequency transformation such as a short-time Fourier transform or a wavelet transform. After a series of convolutional layers and pooling layers, the pre-processed feature maps from the adjacent sensors can, for example, be added and concatenated in layer 8. A further convolutional layer processes the concatenated feature maps (multi-sensor feature extraction) before they can be flattened and passed on to fully-connected layers for classification.

Figure 4:
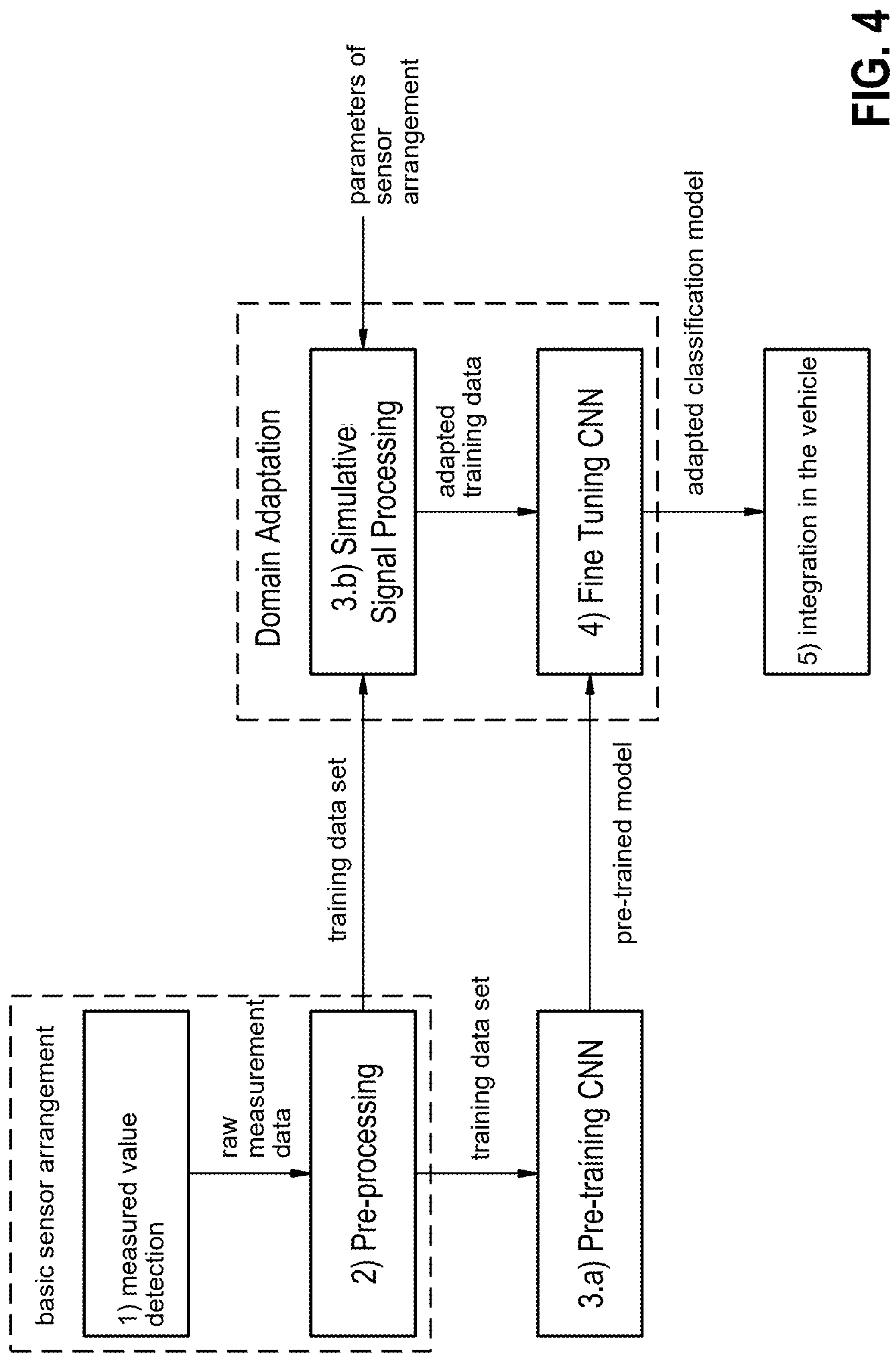
FIG. 4 shows a schematic sequence of a training from measured value detection to the adaptation of the classifier model to a changed sensor arrangement according to an exemplary embodiment of the present invention.

FIG. 4 shows a schematic sequence of a training from measured value detection to the adaptation of the classifier model to a changed sensor arrangement according to an exemplary embodiment of the present invention.

The sequence is shown for a training from the measured value detection under a certain basic sensor arrangement to the adaptation of the classification model to any vehicle-specific sensor arrangement.

An exemplary training data set can consist of measurements of known objects at known measurement positions with a fixed sensor arrangement.

According to one embodiment of the method, it can be provided that the training data are processed individually for each vehicle type (present in the application or in general) so that the corresponding sensor arrangement can be simulated in the training data set, as a result of which an efficient application if the classifier for different vehicle types can be made possible without the effort of additional measurement campaigns.

A methodology for domain adaptation in the training data set from the basic sensor arrangement to the vehicle-specific sensor arrangement can therefore be used.

Advantageously, signal processing of the object-specific time signal segments for each of the sensors can provide the following steps:

Advantageously, an angle of attack can be taken into account, wherein an amplitude modification with respect to the horizontal and vertical directional characteristic of the sensor can be taken into account via the directivity factor Γ with the ratio of the sound pressure p depending on the angles φ and ϑ to a reference sound pressure pmax at the angles φ0 and ϑ0.

Furthermore, the sensor position can be taken into account, wherein a travel time modification and amplitude modification with respect to a movement of the horizontal and vertical sensor position and the object position can be taken into account via the speed of sound c; in particular, when the distance Δd between the sensor and the object backscattering point changes, the changed travel time is Δt=Δd·c and the amplitude change in the time signal p(t) via the geometric propagation attenuation is p'(t)=d0d1 p(t) with the distance d0 between the sensor and the object in the basic sensor arrangement and the distance d1 in the sensor arrangement to be simulated. In addition, the frequency-dependent atmospheric sound attenuation can be taken into account.

Furthermore, a geometry of the installation environment can be taken into account. In this case, the directivity factor Γ can be included by taking into account sound effects such as diffraction, reflection and scattering on elements of the installation environment. The process described so far relates to a physically based simulation of a changed sensor arrangement for the training process.

In the following, fine-tuning of a pre-trained classifier for adaptation to the target domain is explained.

In order to avoid the need for a completely new training with the processed data set, fine-tuning of a model pre-trained with the data set of the basic sensor arrangement can be provided. The pre-trained model may already be able to extract relevant features from existing signals. Through fine-tuning, only minor weight adaptations are carried out in the neural network, as a result of which the model can be adapted to the target domain. This results in significantly reduced training time and thus less application effort. With just a few training epochs, the model can be adapted to a new vehicle type.

According to FIG. 4, after the measured value detection in step 1 (assuming a basic sensor arrangement), the sampled measurement data can be filtered in a pre-processing step 2 and prepared to form the training data set. This training data set can be used, on the one hand, to pre-train the CNN in step 3.*a* and, on the other hand, to create a new training data set by means of simulative signal processing in step 3.*b* (for domain adaptation) by taking into account the parameters of the sensor arrangement and to use it (adapted training data) to carry out the fine-tuning of the CNN in step 4 (also taking into account the pre-training of step 3*a*). Finally, in step 5, the adapted classification model can be integrated into the vehicle.

Although the present invention has been completely described above with reference to preferred exemplary embodiments, it is not limited thereto, but can be modified in many ways.

What is claimed is:

1. A method for ultrasound-based object classification, comprising the following steps:

generating a time reflection signal at a first ultrasonic sensor;

receiving and/or generating secondary signals of at least one or more ultrasonic sensors adjacent to the first ultrasonic sensor, and extracting predetermined features from the secondary signals, which are generated at the adjacent ultrasonic sensors when the time reflection signal is received;

transmitting the time reflection signal and the predetermined features from the secondary signals to a classifier device;

fusing the time reflection signal and the predetermined features by the classifier device; and outputting an object classification by the classifier device.

2. The method according to claim 1, wherein the classifier device includes a neural network or a convolutional neural network (CNN), with feature maps of the first ultrasonic sensor and/or of the adjacent ultrasonic sensors.

3. The method according to claim 1, wherein the fusing takes place in such a way that a training data set for a present sensor arrangement is taken into account.

4. The method according to claim 1, wherein compressed feature maps from CNN convolution layers of the adjacent ultrasonic sensors are transmitted and taken into account in addition to time signals of the first ultrasonic sensor.

5. The method according to claim 4, wherein, in an initial step, features are extracted at the first ultrasonic sensor and at the adjacent ultrasonic sensors and, in the process, convolutional layers are applied and, for fusing the features, feature maps are added to the features of the first ultrasonic sensor and concatenated, and then a further convolutional layer is used for the concatenated feature maps when extracting the fused features, and then the feature data are smoothed and a fully-connected layer carries out object classification.

6. The method according to claim 1, wherein the training data set includes measurements of known objects and at known positions of the known objects and with a fixed sensor arrangement.

7. The method according to claim 1, wherein the training data set is individually processed for a predetermined vehicle type.

8. The method according to claim 1, wherein the training data set takes into account an angle of attack of the first ultrasonic sensor and/or of the adjacent ultrasonic sensors.

9. The method according to claim 1, wherein the training data set takes into account a sensor position with respect to a travel time modification and/or amplitude modification with respect to a movement of the horizontal and/or vertical sensor position and/or object position.

10. The method according to claim 1, wherein the training data set takes into account a geometry of an installation environment of the first ultrasonic sensor and/or of the adjacent ultrasonic sensors.

11. The method according to claim 2, wherein fine-tuning of the classifier device and of a model which the classifier device applies takes place, wherein predetermined weights in the neural network are adapted and an adaptation to a target domain of the sensor arrangements takes place in the process.

12. A device for performing ultrasound-based object classification, comprising:

a control device and/or computer device, which can be connected to a first ultrasonic sensor and to adjacent ultrasonic sensors adjacent to the first ultrasonic sensor;

wherein the control device and/or computer device is configured to:

generate a time reflection signal at a first ultrasonic sensor, receive and/or generate secondary signals of at least one or more ultrasonic sensors adjacent to the first ultrasonic sensor, and extracting predetermined features from the secondary signals, which are generated at the adjacent ultrasonic sensors when the time reflection signal is received, transmit the time reflection signal and the predetermined features from the secondary signals to a classifier device, fuse the time reflection signal and the predetermined features by the classifier device, and output an object classification by the classifier device.

* * * * *